US005534274A

United States Patent [19]
DeStefano

[11] Patent Number: 5,534,274
[45] Date of Patent: Jul. 9, 1996

[54] METHOD FOR RECOVERING WATER FROM FRUIT

[76] Inventor: Donald DeStefano, 100 Ballentine Rd., Andover, N.J. 07821

[21] Appl. No.: 252,055

[22] Filed: Jun. 1, 1994

Related U.S. Application Data

[63] Continuation of Ser. No. 30,591, Mar. 11, 1993, abandoned.

[51] Int. Cl.⁶ .................................. A23L 2/08; C02F 1/02
[52] U.S. Cl. ........................... 426/66; 426/392; 426/397; 426/489; 426/492
[58] Field of Search ............................... 426/66, 67, 392, 426/397, 476, 478, 481, 492, 489, 590, 599

[56] References Cited

U.S. PATENT DOCUMENTS

| | | | |
|---|---|---|---|
| 1,166,674 | 1/1916 | Gould et al. . | |
| 1,940,013 | 12/1933 | Petersen | 426/492 |
| 2,457,315 | 12/1948 | Milleville | 426/492 |
| 2,471,893 | 5/1949 | Pulley | 426/492 |
| 2,483,634 | 10/1949 | Graham et al. . | |
| 2,773,774 | 12/1956 | McCarthy | 426/387 |
| 3,037,975 | 6/1962 | Cohn . | |
| 3,634,128 | 1/1972 | Bolton . | |
| 3,862,014 | 1/1975 | Atkins et al. . | |
| 4,204,915 | 5/1980 | Kurata | 203/2 |
| 4,374,865 | 2/1983 | Strobel . | |
| 4,626,437 | 12/1986 | Schobinger | 426/387 |
| 4,666,561 | 5/1987 | DuFresne | 426/492 |
| 4,687,671 | 8/1987 | Husain et al. . | |
| 4,970,085 | 11/1990 | Persson et al. . | |
| 5,047,149 | 9/1991 | Vion . | |

OTHER PUBLICATIONS

Braverman, J. B. S., *Citrus Products: Chemical Composition and Chemical Technology*, Interscience Publishers, Inc., N.Y., 1949 pp. 275–286.

Nagy, Steven et al., Citrus Science and Technology, vol. 2, The Avi Publishing Company, Inc., Westport, Connecticut, 1977 pp. 221–222.

Hawley's Condensed Chemical Dictionary, Eleventh Edition, p. 7 (1987), Van Nostrand Reinhold.

*Primary Examiner*—Daniel J. Stemmer
*Attorney, Agent, or Firm*—Mathews, Woodbridge & Collins

[57] ABSTRACT

This invention relates to a novel method and system for recovering water from fruit. Water is evaporated from juice during a concentration process. The water can be bottled and distributed to consumers. Water vapor is condensed and water is collected. Preferably, a distribution cone is used for evaporating the water vapor. The water produced has improved purity characteristics.

5 Claims, 3 Drawing Sheets

METHOD FOR RECOVERING WATER FROM FRUIT

This is a continuation application of application Ser. No. 08/030,591 filed Mar. 11, 1993 now abandoned.

BACKGROUND OF THE INVENTION

1. Field of the Invention

This invention relates to a method and system for recovering water from fruit.

2. Description of the Related Art

Over the years, fruit juice consumption has dramatically increased in response to increased consumer health consciousness. In addition, bottled water sales have increased as consumers question the quality of local drinking water. Consumers typically purchase bottled water because it is advertised as being purer and containing less contaminants than local drinking water.

Conventionally extracted fruit juice is subjected to a concentration process to preserve the juice for year round consumption. Concentrates of fruit juices and other liquid foods are conventionally prepared by evaporative techniques such as boiling the starting liquid to vaporize water therefrom. In the concentration process, it is customary to discard the water removed from the concentrate.

The generalized procedure for producing a concentrated consumer product involves: extracting the juice from the fruit, typically the juice by removing water to produce a concentrated serum, discarding the removed water into the ground or in a stream and packing the concentrated serum for sale to consumers.

Various improvements have been made to produce a concentrated serum having improved flavor and appearance. U.S. Pat. No. 4,687,671 describes an apparatus and method involving both evaporative and freeze concentration procedures for retaining a substantial proportion of volatile components of the natural juice in the concentration product. In a first stage, a liquid mixture feed stream is cooled by indirect heat exchange to form a slurry of ice and liquid. The slurry is fed to a wash column to separate ice from the liquid. Thereafter, the ice is melted and discarded from the system. In a second stage, the liquid from the wash column enters an evaporator for removing additional water. Water removed from the evaporator is discarded.

U.S. Pat. No. 4,374,865 describes preparation of natural organic juice concentrate from natural orange juice. The orange juice concentrate is prepared by separating the natural orange juice into a pulp portion and a serum portion. Water is removed from the serum portion. The pulp portion and serum portion are combined to form the orange juice concentrate.

It is known that conventional organic flavor and aroma compounds, known as essence, are removed with water during the evaporation phase. Several references describe recovering the essence and returning the essence to the concentrate. U.S. Pat. No. 4,970,085 describes producing citrus flavored essence by obtaining a citrus aqueous essence containing organic compounds, passing the essence through a solid absorbent so that part of the organic compounds exit the absorbent in a first effluent. At least a part of the first effluent is recycled through the solid absorbent to recover the remaining organic compounds in a second effluent.

U.S. Pat. No. 5,047,149 describes an apparatus for clarifying a liquid such as water. Flotation equipment is used for separating particles from the liquid. The floating particles can be collected at the surface of the flotation equipment.

Of possible general relevance to this application are U.S. Pat. Nos. 2,483,634, 3,862,014 and 3,634,138 related to products recovered from natural juices.

A process for recovering water from fruit is not found in the prior art. It is desirable to provide a process for providing pure water which can be distributed to the consumer. It has unexpectedly been found that water extracted from fruit has purity characteristics which are superior to typical bottled water.

SUMMARY OF THE INVENTION

Briefly described, the present invention relates to a method and system for recovering water from fruit. In the method, fruit juice is extracted from the fruit. The extracted juice is concentrated to remove water from the juice. Preferably, an evaporator is used for removing water vapor from the juice. Water is recovered from the water vapor and can be bottled and sold to consumers.

A four stage evaporation system can be used for removing water from juice. A heater is used to heat extracted juice in a first stage. A distribution cone produces a vapor mist of the extracted juice in a second stage. A third stage includes tubes for separating the vapor from the liquid juice by differential pressure between the tubes. Finally, a fourth stage liquid-vapor separator separates the vapors from the juice. Vapor from the separator can be applied to a condenser for condensing water from the vapor.

It has unexpectedly been found that the recovered water has improved properties of purity and reduced solids composition.

The invention can be more fully understood by reference to the following drawings.

DETAILED DESCRIPTION OF THE INVENTION

During the course of this description, like numbers will be used to identify like elements according to the different figures which illustrate the invention.

Water recovered in the present invention is produced from an all natural product, i.e., wholly from fruit such as orange, grapefruit, apple, cherry, grape, etc. It will be appreciated that other fruits and vegetables could be used in accordance with the teachings of this invention.

Figure 1:
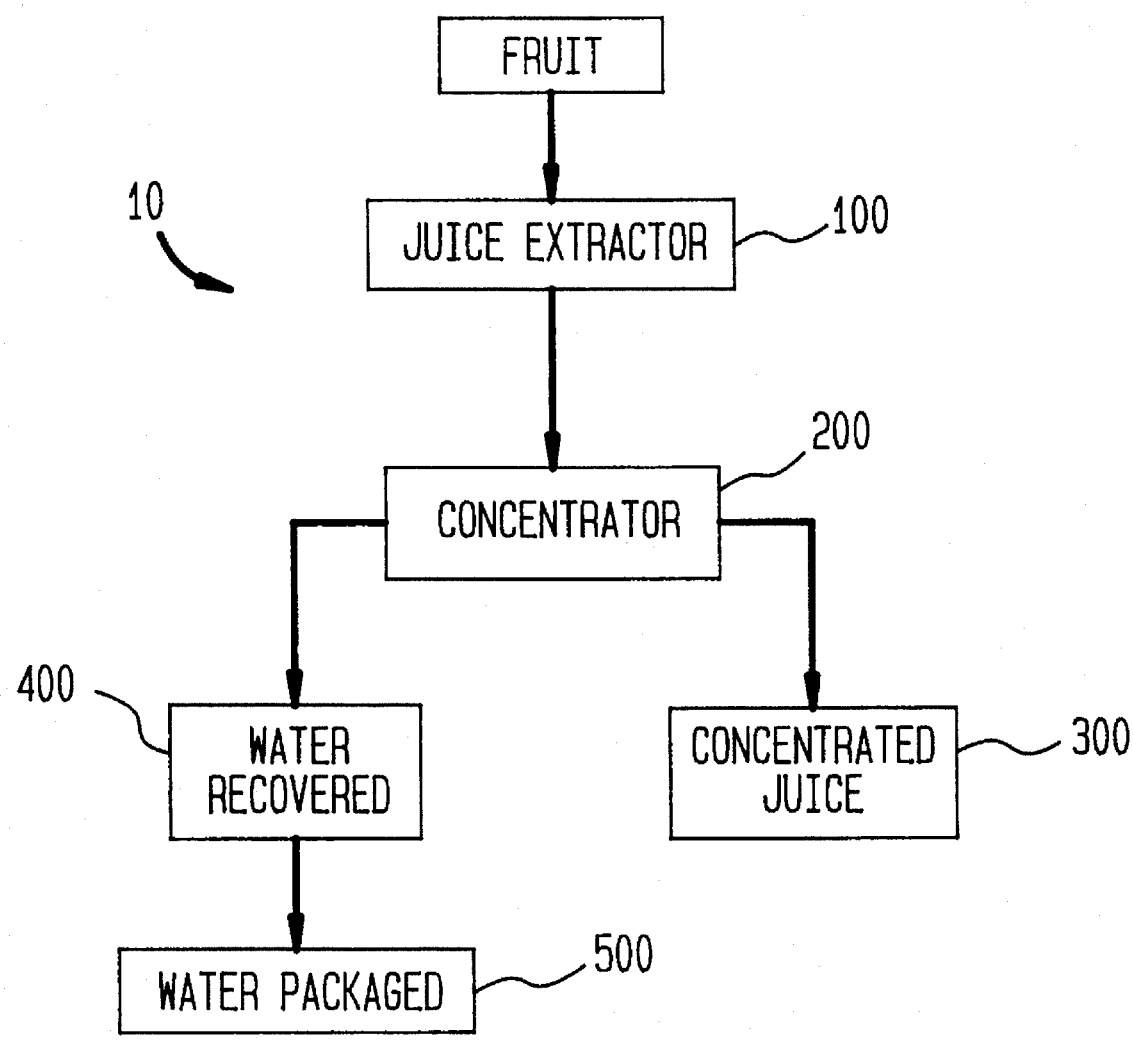
FIG. 1 is a flow diagram of the method of the present invention.

FIG. 1 illustrates a water recovery system 10 in accordance with the principals of the present invention. Fruit is first subjected to extraction with a juice extractor as represented by block 100. Juice extraction can be carried out by any of the known automatic juicing machines or by hand squeezing the fruit. Juice extracted from the fruit is concentrated in a concentrator for separating water from concentrated juice, as shown in block 200. Concentration of the juice in accordance with the invention can be carried out in an apparatus taking various forms. For example, concentration can use freeze concentration procedures or evaporation procedures or sublimation procedures or a combination of evaporation and freeze concentration procedures, as described in U.S. Pat. Nos. 4,374,865 and 4,687,671. It will be appreciated that other concentration procedures known in the art could be used.

Concentrated juice is recovered from the concentrator as shown in block 300. The concentrated juice can be packaged into cans, foil containers, bottles, etc. and distributed to consumers. Water recovered from the concentrator in step 400 can be packaged in step 500 for distribution to the consumer. Water can be recovered with various apparatus which may be dependent on the concentration procedures used. For example, if evaporation is used as the concentration procedure, a condenser to condense the water vapor is used in order to obtain a water product. In addition, if freeze concentration is used to remove water the removed ice can be melted for obtaining the water product. Water can be packaged in bottles and cans or the like.

Figure 2:
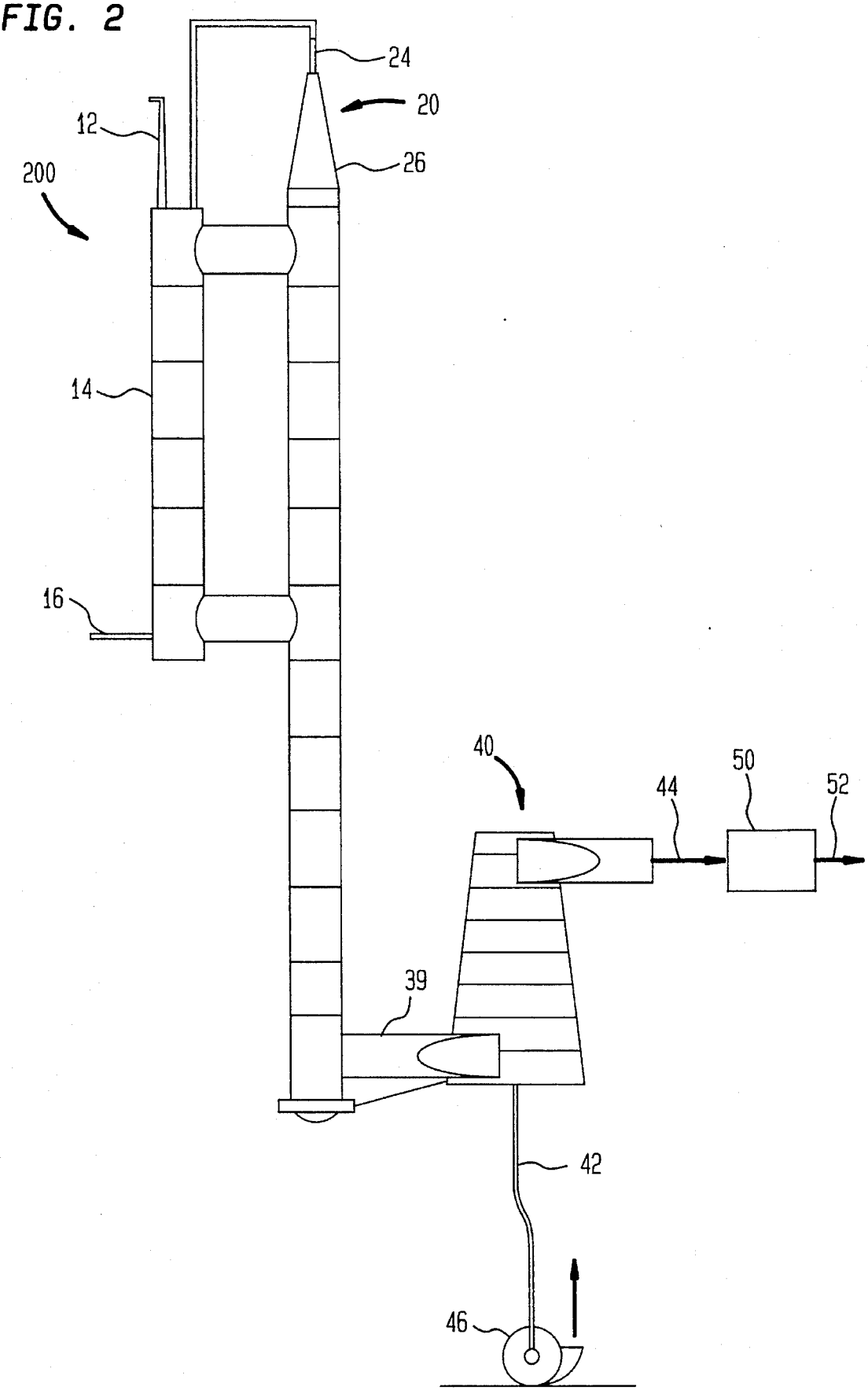
FIG. 2 is a front elevational view of an evaporator used for removing water from fruit in accordance with the present invention.

FIG. 2 is a side elevational view of single-stage concentrator 200 which can be used in the present invention. Single stage concentrator 200 is formed of four interrelated parts for generating an evaporation sequence for the system. In the first stage of concentrator 200, extracted juice stream 12 is heated in heater 14. Steam 16 can be used as an energy source in heater 14. Preferably, extracted juice stream 12 is heated to a temperature of at least 105° F.

Figure 3:
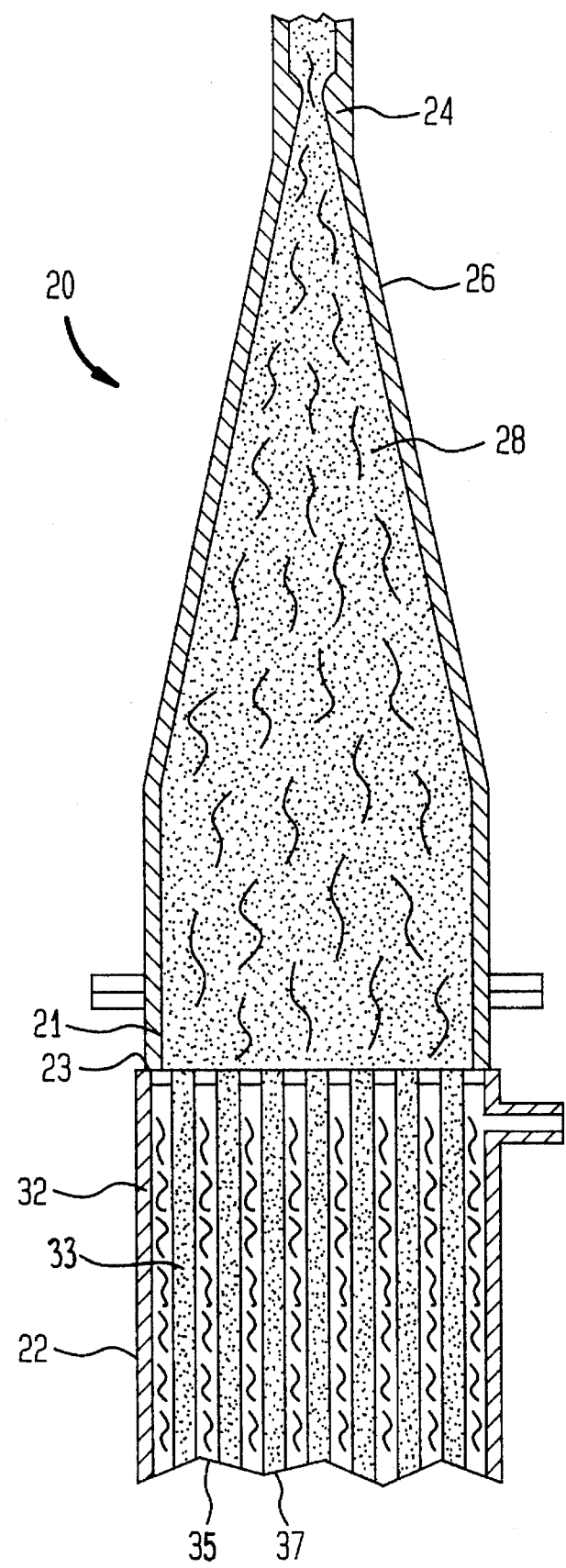
FIG. 3 is a cross-sectional view of a distribution cone of the evaporator shown in FIG. 2.

In a second stage, heated stream 18 is flashed through to distribution cone 20 for converting heated stream 18 to a liquid vapor mist 28. Heated stream 18 enters distribution cone 20 through distribution nozzle 24. Distribution cone 20 includes at least one tube bundle 22 positioned at the lower end 21 of distribution cone 20, as shown in FIG. 3.

Heated stream 18 enters distribution cone 20 at a temperature and pressure greater than the temperature and pressure that exists at inlet end 23 of tube bundle 22. A vacuum is used inside distribution cone 20. The resulting pressure drop and increased expansion volume produces a liquid-vapor mixture 28. The liquid-vapor mixture 28 expands in distribution cone 20 to approximately sixty times its original volume. Liquid-vapor mixture 28 fills expansion cone 26 and evenly enters tube bundle 22, in a third stage of concentrator 200. Liquid vapor mixture 28 falls freely through tube bundle 22. Steam 32 is supplied to wall 33 of tube bundle 22 for heating the tubes. Liquid vapor mixture 28 absorbs heat through tube wall 33. The absorption of heat causes evaporation of vapor. Liquid juice 35 is separated from vapor 37 by differential pressure between tubes in tube bundle 22. Liquid 35 and vapors 37 exit tube bundle 22.

Preferably, liquid vapor mixture 28 is a mist. As a result of liquid-vapor mixture 28 being a mist, the absorption of heat by liquid-vapor mixture 28 causes evaporation of vapor 37 which increases the liquid volume. Tubes in tube bundle 22 have a constant cross sectional area so that the increased volume of the liquid is converted into increased velocity. Liquid 35 and vapor 37 exiting tube bundle 22 preferably have a velocity of about 100 ft/sec. to about 170 ft/sec.

The fourth stage of concentrator system 200 includes a liquid vapor separator 40. Liquid 35 and vapors 37 enter conduit 39 and are supplied to separator 40. The high velocity of liquid 35 and vapors 37 is used to separate vapors 44 from juice product stream 42. Preferably, separator 40 is a drywall separator. Product stream 42 can be pumped with pump 46 to a bottling stage. In the alternative, product stream 42 can be pumped to a subsequent evaporation stage.

Water vapors 44 can be condensed with a condenser 50. Condenser 50 can be a conventional water cooled or refrigerated condenser. Concentrator system 200 preferably has a capacity of 30,000 pounds of juice product per hour. Water 52 from condenser 50 is received at water packaging stage 500. The water product can be pasteurized and micro-filtered by known methods prior to bottling. Carbonation can be supplied to the water product for producing a carbonated water product.

Water recovered from concentrator system 200 has a surprisingly good taste. The clean taste of the water can be related to improved purity over typical water. The water recovered is all natural since it has been recovered from a natural product. In addition, since the water has been encased in a natural fruit, the recovered water has not been exposed to external contaminants and has improved purity characteristics.

The following examples will serve to further typify the nature of this invention but should not be construed as a limitation on the scope thereof, which scope is defined solely by the appended claims.

Testing Procedures

A sample of water recovered from system 10 was tested with the following methods:

| Test | Method |
| --- | --- |
| Dissolved solids | EPA |
| Chloride | ASTM |
| Hardness | ASTM |
| Nitrates | ASTM |
| Sulfates | ASTM |
| Phenols | ASTM |
| Cyanides, total | ASTM |
| Semi-volatile organic compounds (Acid and Base-neutral) | EPA |
| Volatile organic compounds compounds | EPA |
| Metals | EPA |

Semi-volatile and volatile organic components were quantified using a Varian Model 3700 gas chromatograph equipped with dual hydrogen flame ionization detectors and interfaced with a Chemical Data Systems Model 111 Microprocessor.

A Perkin-Elmer 603 Atomic Absorption Spectrometer was used for the metals analysis.

EXAMPLE 1

Water Produced Using Procedure of Present Invention

The following results for wet chemistry and metal analysis are listed in Table 1 for the above sample of water recovered in the present invention.

TABLE 1

| WET CHEMISTRY AND METALS ANALYSIS | |
| --- | --- |
| TEST | RESULTS |
| Total Coliform | 0 PPM |
| Standard Plate Count | 0 PPM |
| pH | 5.01 |
| Turbidity | 0.1 TU |
| Color | 0 APHA Units |

TABLE 1-continued

WET CHEMISTRY AND METALS ANALYSIS

| TEST | RESULTS |
|---|---|
| Taste | Good |
| Odor: Hot | 1.0 |
| Odor: Cold | 1.0 |
| Arsenic | <0.01 PPM |
| Barium | <0.01 PPM |
| Cadmium | <0.001 PPM |
| Chromium | <0.01 PPM |
| Copper | <0.01 PPM |
| Iron | <0.01 PPM |
| Lead | <0.001 PPM |
| Manganese | <0.01 PPM |
| Mercury | <0.001 PPM |
| Selenium | <0.002 PPM |
| Silver | <0.01 PPM |
| Zinc | <0.01 PPM |
| Sulfates | <1.0 PPM |
| Fluorides | <0.05 PPM |
| ABS/LAS | <0.1 PPM |
| Chlorides | 1.0 PPM |
| Hardness | 1.7 CACO$_3$ PPM |
| Nitrates | 0.5 PPM |
| Sodium | 0.5 PPM |
| Total Dissolved Solids | 10.0 PPM |

The following results from a volatile organic analysis is listed in Table 2 from the sample of water recovered in the present invention.

TABLE 2

VOLATILE ORGANIC ANALYSIS

| | MDL | RESULTS |
|---|---|---|
| Dichlorodifluoromethane | 0.36 PPM | None Detected |
| Chloromethane | 0.46 PPM | None Detected |
| Vinyl Chloride | 0.45 PPM | None Detected |
| Bromomethane | 0.04 PPM | None Detected |
| Chloroethane | 0.25 PPM | None Detected |
| Trichlorofluromethane | 0.14 PPM | None Detected |
| 1,1-Dichloroethylene | 0.18 PPM | None Detected |
| Metheylene Chloride | 0.18 PPM | None Detected |
| trans-1,2-Dichloroethylene | 0.17 PPM | None Detected |
| 1,1-Dichloroethane | 0.17 PPM | None Detected |
| 2,2-Dichloropropane | 0.26 PPM | None Detected |
| cis-1,2-Dichloroethylene | 0.14 PPM | None Detected |
| Chloroform | 0.18 PPM | None Detected |
| Bromochloromethane | 0.15 PPM | None Detected |
| 1,1,1-Trichloroethane | 0.35 PPM | None Detected |
| 1,1-Dichloropropene | 0.23 PPM | None Detected |
| Carbon Tetrachloride | 0.20 PPM | None Detected |
| Benzene | 0.19 PPM | None Detected |
| Trichloroethylene | 0.23 PPM | None Detected |
| 1,2-Dichloroethane | 0.10 PPM | None Detected |
| Bromodichloromethane | 0.40 PPM | None Detected |
| Dibromomethane | 0.37 PPM | None Detected |
| cis-1,3-Dichloropropene | 0.16 PPM | None Detected |
| Toluene | 0.13 PPM | None Detected |
| trans-1,3-Dichloropropene | 0.15 PPM | None Detected |
| 1,1,2-Trichloroethane | 0.17 PPM | None Detected |
| Tetrachloroethylene | 0.23 PPM | None Detected |
| 1,3-Dichloropropane | 0.36 PPM | None Detected |
| 1,2-Dichloropropane | 0.18 PPM | None Detected |
| Dibromochloromethane | 0.37 PPM | None Detected |
| 1,2-Dibromoethane | 0.39 PPM | None Detected |
| Chlorobenzene | 0.20 PPM | None Detected |
| Ethylbenzene | 0.18 PPM | None Detected |
| 1,1,1,2-Tetrachloroethane | 0.16 PPM | None Detected |
| m,p-Xylene | 0.13 PPM | None Detected |
| o-Xylene | 0.16 PPM | None Detected |
| Styrene | 0.40 PPM | None Detected |
| Isopropylbenzene | 0.32 PPM | None Detected |

TABLE 2-continued

VOLATILE ORGANIC ANALYSIS

| | MDL | RESULTS |
|---|---|---|
| Bromoform | 0.38 PPM | None Detected |
| 1,1,2,2-Tetrachloroethane | 0.20 PPM | None Detected |
| 1,2,3-Trichloropropane | 0.34 PPM | None Detected |
| n-Propylbenzene | 0.33 PPM | None Detected |
| Bromobenzene | 0.38 PPM | None Detected |
| 1,3,5-Trimethylbenzene | 0.17 PPM | None Detected |
| 2-chlorotoluene | 0.15 PPM | None Detected |
| 4-chlorotoluene | 0.21 PPM | None Detected |
| tert-Butylbenzene | 0.17 PPM | None Detected |
| p-Isopropyltoluene | 0.18 PPM | None Detected |
| 1,3-Dichlorobenzene | 0.24 PPM | None Detected |
| 1,4-Dichlorobenzene | 0.22 PPM | None Detected |
| n-Butylbenzene | 0.29 PPM | None Detected |
| 1,2-Dichlorobenzene | 0.26 PPM | None Detected |
| 1,2-Dibromo-3-Chloropropane | 0.33 PPM | None Detected |
| 1,2,4-Trichlorobenzene | 0.21 PPM | None Detected |
| Hexachlorobutadiene | 0.17 PPM | None Detected |
| Naphtalene | 0.17 PPM | None Detected |
| 1,2,3-Trichlorobenzene | 0.30 PPM | None Detected |
| 1,2,4-Trimethylbenzene | 0.20 PPM | None Detected |
| sec-Butylbenzene | 0.18 PPM | None Detected |

EXAMPLE 2

A sample of typical well water identified as Becker Cremery well water collected from Magnaland Industries was tested with the above-described methods. Table 3 is a comparison of the well water sample and the water recovered from system 10 with Federal Standards defined in U.S. C.F.R. §2.120, Ch. I, Title 21 of F.R. Para. B, added effective May 22, 1974, per Vol. 40, No. 49. F.D.A. Bottled Water.

| Substance | FEDERAL Standards (PPM) | WELL WATER (PPM) | WATER RECOVERED from System 10 (PPM) |
|---|---|---|---|
| Arsenic | 0.05 | 0.008 | 0.01 |
| Barium | 1.0 | — | 0.01 |
| Cadium | 0.01 | 0.001 | 0.01 |
| Chloride | 250.0 | 4.08 | 1.0 |
| Chromium-6 | 0.06 | 0.003 | 0.01 |
| Copper | 1.0 | 0.009 | 0.01 |
| Cyanide | 0.2 | 0.003(total) | — |
| Iron | 0.3 | 0.235 | 0.01 |
| Lead | 0.05 | 0.023 | 0.001 |
| Manganese | 0.05 | 0.075 | 0.01 |
| Nitrate | 45.0 | 1.0 | 0.5 |
| Phenols | 0.001 | 0.002 x | — |
| Selenium | 0.01 | 0.005 | 0.002 |
| Silver | 0.06 | 0.080 x | 0.01 |
| Sulfate | 250.0 | 124.7 | 1.0 |
| Solids | 500.0 | 319.0 | 10.0 |
| Zinc | 5.0 | 0.032 | 0.01 |
| Floride | 1.4 | — | 0.05 |
| Turbidity | 5.0 Units | — | 0.1 |
| Color | 15 Units | — | 0 Units |
| Odor | No. 3 A | — | No. 1 |

The results indicated that the water recovered from system 10 is within the Federal Standards to bottled water. The water recovered from system 10 has a much lower chloride, nitrate, sulfate, and solids pm content then for typical well water.

The water produced by the above-described process has the unexpected property of improved purity and is desirable to consumers. The water product produced by the present invention has been encased in fruit so it is substantially free of contaminants. The process of the present invention has the advantage of recovering water which has heretofore been discarded. In addition, concentrate manufacturers which may be required to treat or remove by-products of the concentrate before discarding the water into a stream will not have to treat separated water during the concentration process. Concentrate manufactures can have the economical advantage of providing a juice concentrate as well as a water product.

While the invention has been described with reference to the preferred embodiment thereof, it will be appreciated by those of ordinary skill in the art that modifications can be made to the structure and form of the invention without departing from the spirit and scope thereof.

I claim:

1. A method for recovering drinking water from fruit comprising the steps of:

extracting juice from fruit;

removing water from said extracted juice to form concentrated juice;

collecting said water removed from said extracted juice, said collected water having less than

| | |
|---|---|
| 0.05 ppm | Arsenic |
| 1.0 ppm | Barium |
| 0.01 ppm | Cadmium |
| 250.0 ppm | Chloride |
| 0.06 ppm | Chromium-6 |
| 1.0 ppm | Copper |
| 0.2 ppm | Cyanide |
| 0.3 ppm | Iron |
| 0.05 ppm | Lead |
| 0.05 ppm | Manganese |
| 45.0 ppm | Nitrate |
| 0.001 ppm | Phenols |
| 0.01 ppm | Selenium |
| 0.06 ppm | Silver |
| 250.0 ppm | Sulfate |
| 500.0 ppm | Solids |
| 5.0 ppm | Zinc |
| 1.4 ppm | Fluoride | a turbidity of less than 5.0 units, less than 15 units of color, and an odor which does not exceed odor No. 3A; and bottling said collected water at a water packaging station for distribution to consumers, wherein said bottled water is drinking water fit for human consumption.

2. The method of claim 1 wherein said removing step includes evaporating said water from said extracted juice to form evaporated water.

3. The method of claim 2 wherein said collecting step includes condensing said evaporated water from said extracted juice to form condensed water.

4. The method of claim 1 wherein said removing step includes:

applying steam to said extracted juice for heating said extracted juice and flashing said heated juice through a distribution cone into a liquid-vapor mixture and separating said liquid-vapor mixture into said concentrated juice and said evaporated water.

5. The method of claim 4 wherein said collected water has a solids composition of not greater than 10 ppm.

* * * * *